United States Patent [19]

Kawai et al.

[11] Patent Number: 4,847,634
[45] Date of Patent: Jul. 11, 1989

[54] METHOD AND APPARATUS FOR CORRECTING SNAKING IN A ROLLFILM FEEDING APPARATUS

[75] Inventors: Kenji Kawai; Masakzu Ohtorii, both of Shiga; Tsutomu Ueyama; Takumi Yoshida, both of Kyoto, all of Japan

[73] Assignee: Dainippon Screen Mfg. Co., Ltd., Japan

[21] Appl. No.: 127,073

[22] Filed: Dec. 1, 1987

[30] Foreign Application Priority Data

Dec. 5, 1986 [JP] Japan ................................ 61-288925

[51] Int. Cl.4 ........................................... G01D 15/24
[52] U.S. Cl. .................................... 346/136; 346/1.1; 346/108
[58] Field of Search ........................ 346/136, 108, 1.1

[56] References Cited

U.S. PATENT DOCUMENTS

| | | | |
|---|---|---|---|
| 4,062,021 | 12/1977 | Taylor | 346/136 |
| 4,080,634 | 3/1978 | Schrieber | 358/298 |
| 4,268,163 | 5/1981 | Doi et al. | 355/14 SH |
| 4,491,854 | 1/1985 | Habelt et al. | 346/136 |
| 4,516,142 | 5/1985 | Yamamoto et al. | 346/108 |
| 4,560,295 | 12/1985 | Fujiwara et al. | 346/136 |
| 4,567,491 | 1/1986 | Lawrence | 346/136 |
| 4,621,535 | 11/1986 | Bronson et al. | 74/405 |
| 4,663,638 | 5/1987 | Hirose | 346/136 |
| 4,686,541 | 8/1987 | Rosier | 346/108 |
| 4,725,858 | 2/1988 | Bond | 346/136 |

FOREIGN PATENT DOCUMENTS 0030228 3/1978 Japan .................................... 346/136

OTHER PUBLICATIONS

European Search Report–Dainippon Screen Mfg. Co., Ltd.-Appln. No. 87117965.1.

Primary Examiner—E. A. Goldberg
Assistant Examiner—Huan Tran
Attorney, Agent, or Firm—Ostrolenk, Faber, Gerb & Soffen

[57] ABSTRACT

An apparatus for correcting snaking of rollfilm comprises a driving roller for feeding the rollfilm to the exposure position with the film being maintained flat, pinch rollers provided such that they can approach or be separated from the driving roller, switching means for switching between the abutment and separation of the pinch rollers and the driving roller, and cutting means for cutting the rollfilm.

22 Claims, 3 Drawing Sheets

METHOD AND APPARATUS FOR CORRECTING SNAKING IN A ROLLFILM FEEDING APPARATUS

BACKGROUND OF THE INVENTION

1. Field of the Invention

The present invention relates to means for correcting snaking, that is, a phenomenon in which a sensitized material or a thermosensitive paper in a roll form (hereinafter referred to as rollfilm) such as rolled film or paper is biased and shifted from a prescribed position in the width direction thereof. More specifically, it relates to a method and apparatus for correcting snaking of rollfilms in an image recording apparatus in which the rollfilm is exposed while the same is fed.

2. Description of the Prior Art

The image recording apparatuses employing rollfilms have been widely known and one example is disclosed in U.S. Pat. No. 4,080,634. The above referenced U.S. Pat. No. 4,080,634 is entitled "Halftone reproduction device with high resolution scanning and recording system", and issued to ECRM, Inc. on Mar. 21, 1978. The above referenced U.S. patent is incorporated herein by reference.

In an image recording apparatus employing rollfilms, a rollfilm is transferred, with the same nipped between a driving roller and an opposing nip roller.

On this occasion, if the shape of the roller is not a perfect right circular cylinder but is tapered, or the contact pressure of the nip roller is imbalanced in the left/right direction, then the rollfilm is not properly fed in the longitudinal direction thereof but is biased in the width direction, and the film snakes. When the rollfilm is relatively short, this snaking sometimes does present a serious problem, and may be neglected.

However, the amount of deviation is accumulated in proportion to the amount of rollfilm being fed. Therefore, when a large number of pictures are to be recorded on a long rollfilm, the snaking becomes a problem.

A number of corrective measures for snaking have been proposed. In one proposal, the pressure of the springs provided at both ends of the nip roller is adjusted so as to feed the rollfilm properly.

In another proposal, the driving roller is formed to have a convex form so that the rollfilms is automatically brought to the center of the roller.

In the first mentioned method, the pressure of the springs provided at both ends of the nip roller is adjusted to make the nip pressure level for the entire length of the roller. Therefore, the first mentioned method is troublesome and not efficient. Since an extremely delicate adjustment of the balance of the left and right nip pressure is required in the first mentioned method, there is a possibility that the pressure of the left and right nips may become imbalanced and cause snaking. Readjustment of the nip pressure is required each time this occurs.

The method includes trial and error steps in which the rollfilm is actually fed and the pressure of the nip is adjusted according to the monitored condition of snaking.

The second mentioned method employing a convex driving roller includes the step of automatically aligning the position of the rollfilm at the center of the roller. In order to accomplish this, an image reading apparatus may be employed in which the surface of the film wound around the outer circumference of the roller is subjected to slit exposure or to light beam exposure. However, such apparatus includes a problem of distortion generated in the reproduced image, since the film surface at the exposure position is warped.

SUMMARY OF THE INVENTION

It is accordingly an object of the present invention to provide an apparatus and method for correcting snaking of a rollfilm in which the operation is simple and the film surface at the exposure position is not warped.

The above and other objects may be accomplished by providing an apparatus comprising a means for feeding the film which includes a rollfilm gripping means which can be switched between a rollfilm gripping position and a rollfilm releasing position and further comprising a regulator means for alternatively moving said gripping means between said gripping and releasing positions. Switching from gripping to releasing position may be carried out for instance after each exposure of a segment of rollfilm being moved through an exposure region.

Since the apparatus for correcting snaking of the rollfilm in accordance with the present invention is thus structured. The apparatus and method for correcting snaking of rollfilm in accordance with the invention requires neither trial and error adjustments nor warping of the film surface to be exposed.

According to a preferred embodiment, the apparatus for correcting snaking of the rollfilm comprises a driving roller, nip rollers movable between the position abutting on the driving roller and the position apart from the driving roller, apparatus for switching the movement of the nip rollers and a rollfilm cutting apparatus which is associated with said switching apparatus for switching the movement.

By thus structuring the apparatus for correcting snaking of the rollfilm, the adjustment of snaking of the rollfilm can be accomplished by a simple structure.

These objects and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be hereinafter described with reference to the figures.

Figure 1:
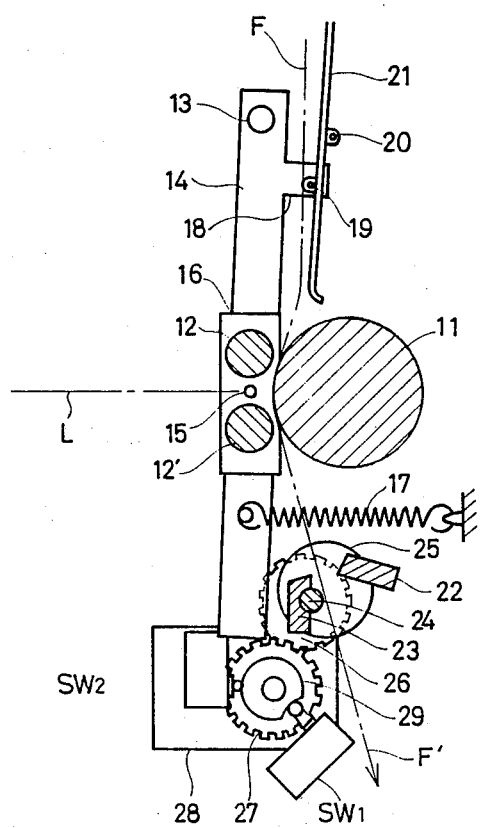
FIG. 1 is a cross-sectional side view showing one embodiment of the present invention.
Figure 2:
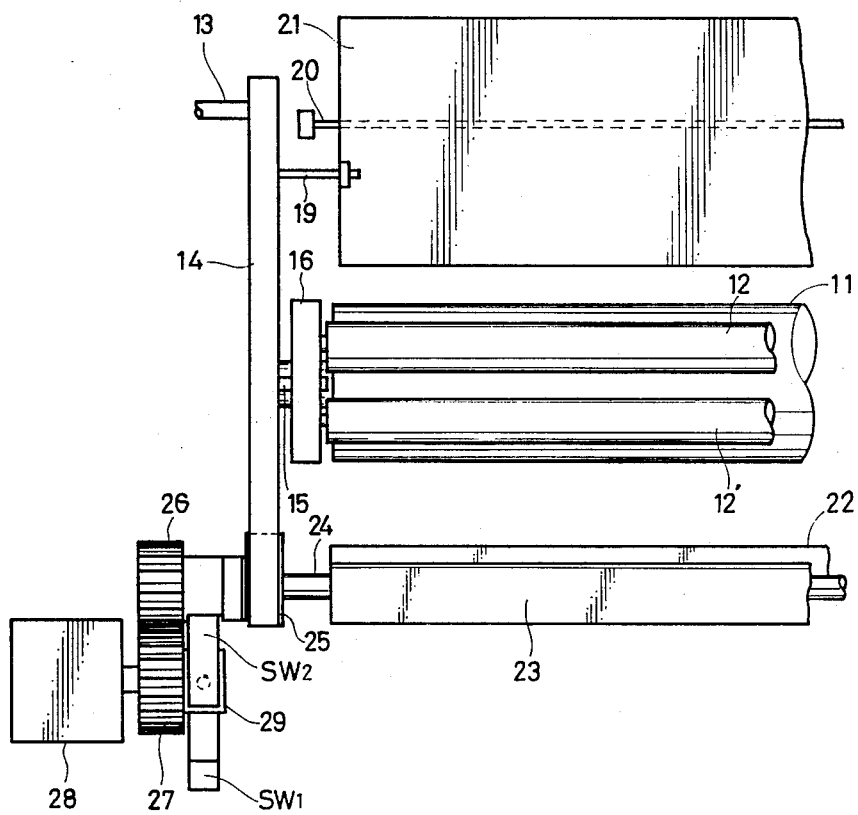
FIG. 2 is a front view of the main portion of the apparatus shown in FIG. 1.
Figure 3:
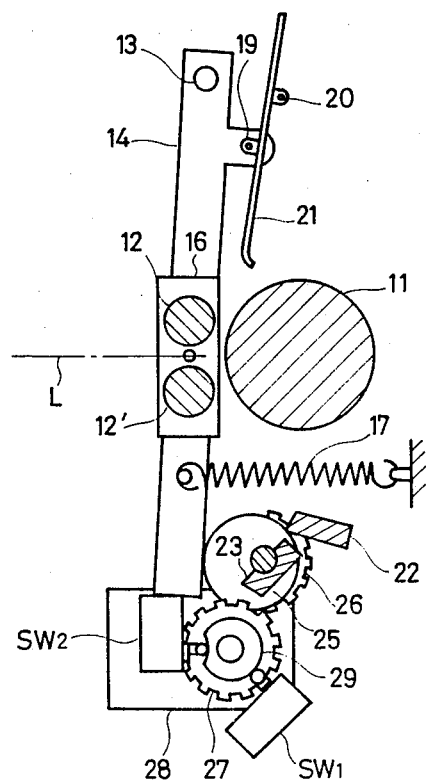
FIG. 3 is a cross-sectional side view showing the other operation of the apparatus shown in FIG. 1.

FIGS. 1 to 3 show one embodiment of the apparatus for correcting snaking of the rollfilm in accordance with the present invention. This embodiment includes an application of the present invention to an image recording apparatus in which scanning and exposure are carried out spirally by a light beam such as laser light modulated by image signals from the original.

FIG. 1 is a cross-sectional side view showing a main portion of the apparatus for correcting snaking of the rollfilm, FIG. 2 is a front view of the main portion thereof and FIG. 3 is a cross-sectional side view showing the apparatus in the snaking correcting operation.

Referring to FIG. 1, the driving roller (11) is pivoted at that position where the film on its outer circumference may be exposed to said light beam. A rollfilm (F) is fed between the driving roller (11) and a pair of nip rollers (12) and (12') from above and is travelled, as shown by the chained line.

An upper end portion of a lever (14) is attached to a supporting shaft (13) which is erected on an appropriate portion of the frame of the exposure portion (not shown). An axis (15) is provided at the middle portion of the lever (14). A pair of nip rollers (12) and (12') are rotatably supported by a swinging plate (16) attached to the said axis (15). A spring (17) is engaged with the lower portion of the lever (14) so that the nip rollers (12) and (12') are energized to be in pressure contact with the driving roller (11).

An arm (18) projecting to the driving roller is provided in the upper portion of the lever (14). A pin (19) which is erected on the arm (18) is engaged with an appropriate portion of the guide plate (21) which is attached to an axis (20). As a result, the guide plate (21) is inclined in association with the rotation of the lever (14). This guide plate (21) is provided to ensure that the tip end of the rollfilm is fed between the driving roller (11) and the upper nip roller (12) at the time of rolling the rollfilm. The function of the guide plate will be described in the following.

A cutter apparatus for cutting the rollfilm in the width direction is provided below the driving roller (11). This apparatus comprises a fixed blade (22) and a rotary blade (23) provided in parallel to the rollers. The rotary blade (23) is rotated in the clockwise direction in FIG. 1 by a rotary axis (24), with the rollfilm being cut when interposed between the rotary blade (24) and fixed blade (22).

An eccentric cam (25) is fitted and fixed to the rotary axis (24) in such a manner that the lower end portion of the lever (14) is pressed by cam (25) in synchrony with the rotation of the rotary blade (23), causing nip rollers (12) and (12') to be separated from the driving roller (11).

The lever (14), swinging plate (16), spring (17), pin (19) and the eccentric cam (25) are provided at each of both ends of the nip rollers (12) and (12'). Each set is provided symmetrically.

One end of the rotary axis (24) of the cutter apparatus extends out of the eccentric cam (25) as shown in FIG. 2, and a gear (26) is attached thereto. The engaging gear (27) is rotatingly driven in the counterclockwise direction in FIG. 1 by a driving apparatus (28) comprising a suitable motor, decelerating apparatus and so on.

A cam (29) activating two switches ($SW_1$) and ($SW_2$) for positioning is attached to the same axis as with the gear (27). Each of the switches is activated when it is engaged with the concave of the cam (29). Namely, in the situation of FIG. 1, the switch ($SW_1$) is activated. In the situation of FIG. 3, in which the cam (29) is rotated by about 225° in the counterclockwise direction, the switch ($SW_2$) is activated.

The function of the apparatus in accordance with the illustrated embodiment will be hereinafter described.

In the scanning exposure, the function is as shown in FIG. 1, namely, the eccentric cam (25) is separated from the lever (14) and the pair of nip rollers (12) and (12') nip the rollfilm (F) with presure on the outer circumference of the driving roller (11). The driving roller is driven by a constant peripheral speed defined corresponding to the feeding speed of the rollfilm (F) and the film (F) is fed. At the same time, the rollfilm (F) is scanned and exposed spirally by the light beam. The exposed rollfilm is fed out in the tangential direction at the contact portion of the lower nip roller (12') and the driving roller (11), as shown in the chained line (F'). The rollfilm is fed through two blades (22) and (23) of the cutter apparatus.

On this occasion, if the driving roller (11) has some error in its form or if the contact pressure of the nip roller (12) or (12') against the driving roller is uneven, then the rollfilm snakes. The amount of deviation is small for the feeding of a length corresponding to one picture plane and the recorded image is not badly influenced. However, if a bias in width direction is generated on the rollfilm at the position of the driving roller (11), an inner stress or elastic deformation is caused in the film web from the supply reel to the driving roller (11).

After the exposure of all the desired image regions is completed, the driving roller (11) is driven to feed the rollfilm (F) until the rear end portion of the image or the rear end portion of the necessary margine passes through the cutting position of the cutter apparatus. Thereafter, the driving roller (11) is stopped and the driving apparatus (28) is energized to activate the cutter apparatus.

The rotary blade (23) is rotated through the gears (27) and (26) and the rollfilm (F) interposed between the rotary blade (23) and the fixed blade (22) is cut. The cut film is carried to an exposed film withdrawing magazine or to the developing device of the succeeding stage by a feeding apparatus, not shown.

Simultaneously with the film cutting by the cutter apparatus, the eccentric cam (25) attached to the rotary axis (24) is rotated. The cam (25) presses the lower end of the lever (14) against the spring (17). As a result, the pair of nip rollers (12) and (12') are separated from the driving roller (11). Consequently, the rollfilm (F) is released from the grip between the nip rollers (12) and (12') and the driving roller (11). Therefore, even if there is a bias in the width direction, the rollfilm (F) automatically returns, by the inner stress or elasticity of the rollfilm, to the neutral position the film should occupy.

In the position shown in FIG. 3, where the rotary axis (24) and cam (29) are rotated by about 225°, the switch ($SW_2$) engages with the concave of the cam (29) to stop the driving apparatus (28). In the rest time when the exposure is not carried out, the apparatus is kept in this state. Namely, if the nip rollers (12) and (12') are kept in contact with the driving roller (11) in the rest time, the roller can possibly be deformed. Therefore, in the rest time, nip rollers are separated from the driving roller.

When the operation is started again, the driving apparatus (28) is activated at the same time as or before the start of feeding by the driving roller (11). The rotary axis (24) and the cam (29) are rotated by about 135° to be in the state of FIG. 1.

Meanwhile, the guide plate (21) arranged above the driving roller (11) is inclined as shown in FIGS. 1 and 3 in association with the movement of the nip rollers (12) and (12'). In the state of FIG. 1, in which the nip rollers (12) and (12') are in contact pressure with the driving roller (11), the guide plate (21) is slightly separated from the path in which the rollfilm is fed. In the state of FIG. 3, in which the nip rollers (12) and (12') are separated from the driving roller (11), the guide plate is inclined to the tangential direction of the driving roller (11). The positions of the axis (20) and the pin (19) being erected on the lever (14) are selected such that the guide plate (21) performs the above described operation.

This guide plate (21) is not directly connected to the feeding and adjustment of snaking of the rollfilm as described above. It is used for easily guiding the tip end of the film to the circumference of the driving roller (11) when a new rollfilm is loaded in the apparatus. Namely, it is used when a preceding rollfilm is consumed and a new rollfilm is loaded, whereby the tip end of the rollfilm is easily introduced between the driving roller (11) and the pair of nip rollers (12) and (12'). Since the tip end of the rollfilm is fed along the surface of the guide plate (21) which is aligned with the tangential direction of the driving roller (11), the new rollfilm can be easily loaded.

Meanwhile, if the guide plate (21) is fixed at the position which is aligned with the tangential direction of the driving roller (11), the following problem occurs. Namely, in feeding the rollfilm by the driving roller (11) during scanning exposure, the film is in sliding contact with the surface of the guide plate (21), increasing the friction resistance. Consequently, the feeding speed may possibly become uneven. Therefore, when the nip rollers (12) and (12') are in pressure contact with the driving roller (11), the guide plate (21) is retracted from the path of the rollfilm to eliminate undesirable friction.

The present invention has been described with reference to the illustrated embodiment. However, the present invention is not limited to the above described embodiment and various modifications can be made.

For example, in the above embodiment, the spiral scanning type image recording apparatus is employed. In the spiral scanning type image recording apparatus, the light beam which is biased and is directed in the main scanning direction is modulated by image signals whereby the reproduction images are recorded.

However, the apparatus for correcting snaking according to the present invention may be applied to an intermittent scanning type image recording apparatus. In the intermittent scanning type image recording apparatus, images on the linear regions are projected on the rollfilm through slits, whereby the reproduction images are recorded.

In addition, the present invention can be applied to an apparatus other than scanning exposure type, for instance, it can be applied to the apparatus such as reproduction cameras in which the whole picture in one image plane is recorded by the entire exposure at one time. In this case, driving roller and nip rollers are respectively arranged before and after the exposure position so that the rollfilm is held at the exposure position and fed. In this case, the snaking of the rollfilm can be adjusted by the same means.

Although the present invention has been described and illustrated in detail, it is clearly understood that the same is by way of illustration and example only and is not to be taken by way of limitation, the scope of the present invention being limited only by the terms of the appended claims.

What is claimed is:

1. An apparatus for feeding a film in a longitudinal direction, said apparatus comprising:
   feeding means capable of advancing a film along a predetermined longitudinal path, said feeding means being movable between a film gripping position wherein said feeding means is capable of contacting a film sufficiently that said film cannot move independently of said feeding means, and a film releasing position wherein said feeding means releases said film sufficiently that said film may move independently of said feeding means, said feeding means at least occasionally feeding said film in a direction skew to said longitudinal direction in such a manner that said film is biased laterally with respect to said longitudinal path so that a lateral tension is built up in said film; and
   regulatory means for causing said feeding means to move periodically into said film releasing position where said film is sufficiently free to move independently of said feeding means that said lateral tension returns said film to said longitudinal path.

2. An apparatus according to claim 1, wherein said feeding means comprises a rotary driven driving roller and a pinch roller, said pinch roller being movable between a first position abutting on said driving roller to form an abutting portion and a second position separated from said driving roller, and wherein said abutting portion is capable of gripping film when said pinch roller abuts said driving roller.

3. An apparatus according to claim 2, wherein more than one pinch roller is provided, each of said pinch rollers having a rotary axis extending parallel to the remaining pinch rollers and spaced apart from each other.

4. The apparatus of claim 3, wherein said film is cut at regular intervals.

5. The apparatus of claim 4, wherein said pinch roller moves between said first position and said second position at regular intervals and assumes said second position substantially simultaneously with said cutting.

6. The apparatus according to claim 3, wherein the space between two pinch rollers includes means for exposing film to light.

7. An apparatus according to claim 2, wherein said regulatory means comprises means for separating said pinch roller from said driving roller.

8. An apparatus according to claim 7, wherein said pinch rollers are supported by a pair of swing levers provided on both ends of an axis,
   said pair of swing levers being capable of approaching and of being separated from said driving roller wherein
   said regulatory means comprises means for allowing said swing lever to approach the side of said driving roller and for separating the same from said driving roller.

9. An apparatus according to claim 1, further comprising
   cutting means provided below said feeding means for cutting said film in the width direction thereof.

10. An apparatus according to claim 9, wherein said cutting means comprises a fixed blade extending in the width direction of said film and a rotary blade capable of engaging said fixed blade.

11. An apparatus according to claim 9, further comprising associating means for allowing said cutting means and said regulatory means to be in association with each other.

12. An apparatus according to claim 11, wherein said associating means activates said regulatory means after said film is cut.

13. An apparatus according to claim 12, wherein said pair of swing levers have their upper ends pivotably supported and their lower ends energized such that said pinch rollers abut on said driving roller, and wherein said associating means comprises means for pressing said swing levers to the opposite side from said energized position after the operation of said cutting means.

14. An apparatus according to claim 6, wherein said feeding means is moved into said releasing position after said film is exposed by said exposure mean.

15. The apparatus according to claim 14, wherein said pinch rollers are supported by a pair of swing levers provided on both ends of the axis, wherein said pair of swing levers are capable of approaching and of being separated from said driving roller, and wherein said regulatory means comprises means for allowing said swing lever to approach the side of said driving roller and for separating the same from said driving roller.

16. The apparatus according to claim 15, wherein said pair of swing levers have their upper ends pivotably supported and the lower ends energized so that said pinch rollers abut on said driving roller, and wherein said associating means comprises means for pressing said swing levers (14) to the opposite side from said energized position after the operation of said cutting means.

17. The apparatus according to claim 16, further comprising cutting means provided below said feeding means for cutting said film in the width direction thereof.

18. The apparatus according to claim 17, wherein said cutting means comprises a fixed blade extending in the width direction of said film and a rotary blade which engages with said fixed blade.

19. A method for correcting snaking in a film feeding apparatus, said method comprising the steps of:

feeding said film along a predetermined longitudinal path by gripping at least a portion thereof with a gripping means, said gripping means at least occasionally feeding said film in a direction skew to said longitudinal path and in such a manner that said film is biased laterally with respect to said longitudinal path and a lateral tension is built up in said film; and periodically releasing said grip on said film sufficiently to allow said lateral tension in said film to return said film to said longitudinal path.

20. A method according to claim 19, said method further comprising the step of cutting said film after the step of exposing said film and before the step of releasing said grip.

21. The method according to claim 19, wherein said film is fed to an exposure means and exposed to light prior to releasing said grip.

22. The method according to claim 19, wherein said film is maintained in a flat configuration as it is fed.

* * * * *